United States Patent
Maricic et al.

(10) Patent No.: US 9,639,725 B1
(45) Date of Patent: May 2, 2017

(54) TRACKING ASSOCIATE FOR FACTORY AND WAREHOUSING OPTIMIZATION

(71) Applicant: GENERAL ELECTRIC COMPANY, Schenectady, NY (US)

(72) Inventors: Danijel Maricic, Niskayuna, NY (US); Michael James Hartman, Clifton Park, NY (US); John Erik Hershey, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/971,413

(22) Filed: Dec. 16, 2015

(51) Int. Cl.
*G06K 7/10* (2006.01)
*G06Q 10/08* (2012.01)
*H04N 5/232* (2006.01)
*G06K 7/14* (2006.01)

(52) U.S. Cl.
CPC ..... *G06K 7/10554* (2013.01); *G06K 7/10861* (2013.01); *G06K 7/1417* (2013.01); *G06Q 10/087* (2013.01); *H04N 5/232* (2013.01)

(58) Field of Classification Search
CPC . A61B 1/00172; A61B 5/0068; G01S 7/4817; G01S 17/89
USPC ................. 235/454, 462.01–462.49
See application file for complete search history.

(56) References Cited

U.S. PATENT DOCUMENTS

| | | | |
|---|---|---|---|
| 5,000,567 A * | 3/1991 | Fleshner | G01S 17/89 356/28.5 |
| 5,155,345 A * | 10/1992 | Ito | A47F 9/046 235/383 |
| 6,542,083 B1 | 4/2003 | Richley et al. | |
| 6,832,728 B2 | 12/2004 | Kennedy | |
| 7,348,886 B2 | 3/2008 | Himberger et al. | |
| 8,567,677 B1 * | 10/2013 | Yap | G06K 7/12 235/454 |
| 2009/0251286 A1 | 10/2009 | Black et al. | |
| 2011/0024500 A1 | 2/2011 | Mcreynolds et al. | |
| 2014/0117077 A1 | 5/2014 | Hamilton et al. | |
| 2014/0160235 A1 * | 6/2014 | Norland | H04N 7/18 348/37 |
| 2015/0060551 A1 | 3/2015 | Fleming et al. | |

OTHER PUBLICATIONS

O. Kilinc et al., "Image Processing Based Indoor Localization System", Signal Processing and Communications Applications Conference (SIU), 2014 22nd, Apr. 23-25, 2014, pp. 1654-1657.

* cited by examiner

*Primary Examiner* — Jamara Franklin
(74) *Attorney, Agent, or Firm* — Joseph J. Christian (57) ABSTRACT

A tracking associate system that comprises a rotatable platform; an optically retroreflective label reader attached to the platform; a control unit attached to the rotatable platform; a scene recording camera; and a data network configured to process data produced by the label reader and/or the camera. Another tracking system comprises one, or more, label tracking pairs that each have a recording camera associated with a light source emitter; a platform configured to allow the label tracking pair to track a plurality of optically retroreflective labels that are affixed to objects; and a data network in communication with the label tracking pair that is configured to process data received from the label tracking pair.

14 Claims, 8 Drawing Sheets

TRACKING ASSOCIATE FOR FACTORY AND WAREHOUSING OPTIMIZATION

BACKGROUND OF THE INVENTION

The present invention relates generally to factory and warehousing optimization and, more particularly, to a tracking associate that improves factory and warehousing operations, and, thus, efficiencies with a concomitant reduction of cost and logistical improvement.

In the field of factory and warehousing optimization there is a need for a system whereby an individual object can be quickly located and tracked at distances that would otherwise require a worker to spend time to search for the object(s) and to physically move close to the object(s) to verify its identity and, perhaps, even move intervening objects. Another need is to provide a technique to physically tag an object that may require special handling or further work or has some condition that must be noted when the object has been stored or is in transit. Yet still another need is to provide a network that both links multiple tracking devices and processes and formats their data so that the resultant records can be catalogued for efficient storage and retrieval. The network may also provide for an interface with a massive data storage facility. Yet still another need is to provide factory and warehousing personnel with an interactive database that will efficiently allow discovery of the status of objects that are brought into the facility; stored in the facility; and/or, moved within and from the facility.

Various techniques have been developed that attempt to identify workpieces on a factory or warehouse floor. Similarly, techniques for estimating distances to an object are also being developed.

Accordingly, there is an opportunity for improving upon known methodologies in warehouse and factory optimization in non-obvious ways so as to address at least some of these aforementioned, and other, needs.

BRIEF DESCRIPTION

The present invention overcomes at least some of the aforementioned drawbacks by providing a system and method taught herein for an asset and product tracking system that enables numerous objects comprising the factory's or warehouse's assets and workpieces produced and stored to be tracked as to their identities and/or their spatial positions.

Therefore, in accordance with one aspect of the invention, a tracking associate system comprises: a rotatable platform; an optically retroreflective label reader attached to the rotatable platform; a control unit operatively attached to the rotatable platform; a scene recording camera; and a data network configured to process data produced by at least one of the optically retroreflective label reader and the scene recording camera.

In accordance with another aspect of the invention, a tracking system comprises: at least one label tracking pair, wherein the at least one label tracking pair comprises a recording camera associated with a light source emitter; a platform configured to allow the at least one label tracking pair to track a plurality of optically retroreflective labels wherein each of the plurality of optically retroreflective labels are affixed to objects; and a data network in communication with the at least one label tracking pair, the data network configured to process data received from the at least one label tracking pair.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %", is inclusive of the endpoints and all intermediate values of the ranges of "about 5 wt. % to about 25 wt. %", etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

The asset and product tracking associate disclosed herein will allow numerous objects comprising the factory's assets and workpieces produced and stored to be tracked as to their identities and their spatial positions. The workpieces may also be tagged in a manner that will allow special information to accompany them such as, but not limited to, notations regarding special handling required or future work that may need to be done on the objects.

A method of tracking an object first comprises printing a remotely readable label and affixing the label to the object. The information on the remotely readable label is encoded onto the label prior to its printing. The printing may be done at, or near to, the factory where the objects are produced or the warehouse where the objects are stored. The label may be tracked by any of a networked set of optical readers. The data affiliated with the individual objects is processed as needed and stored in a large data storage facility that may be external to the factory, such as a cloud.

The label used by the asset and product tracking system is composed of a material patch, such as a paper with printing, which can be easily and temporarily affixed to an object in such a manner as to allow it to be illuminated by a light source that may comprise infrared light. The light source may be proximate or distal to the object.

Figure 1:
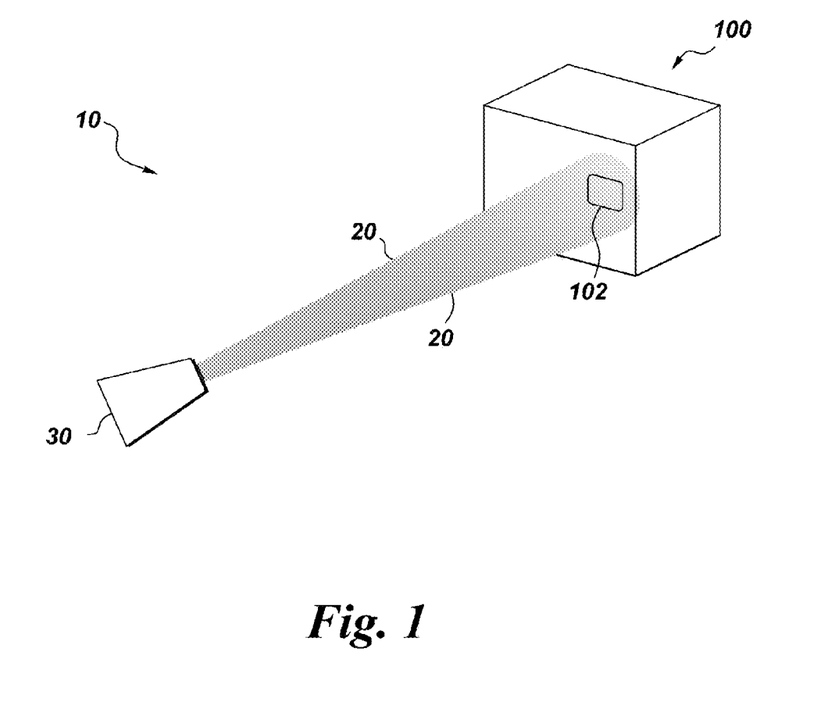
FIG. 1 is a schematic diagram of a portion of a system illuminating a label attached to an object according to embodiments of the present invention.

As illustrated in FIG. 1, a system 10 comprises a light source 30 that sends out a cone of light 20 illuminating the label 102 on the object 100. The printing on the label 102 may reveal many items of logistically important information such as part identification, part number, date of production, special handling requirements, and/or special notations regarding further work that might need to be performed on the object 100.

Figure 2:
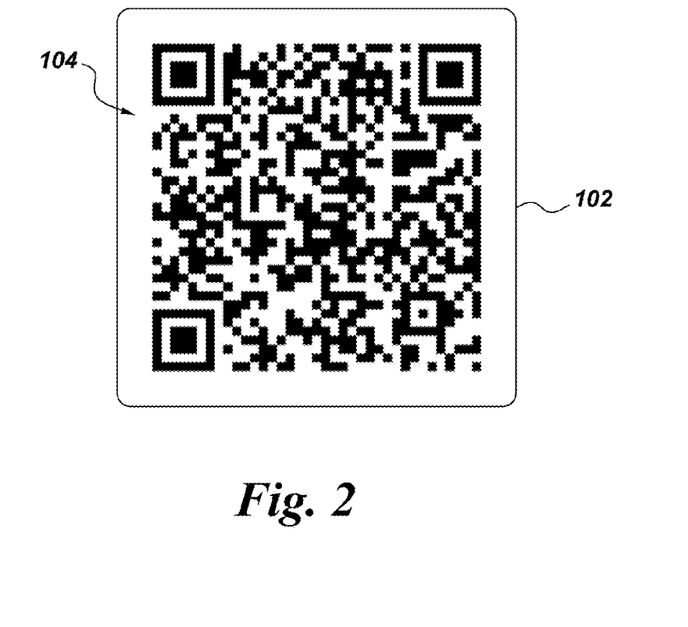
FIG. 2 is an exemplary QR code.

The printing on the material patch uses an optically retroreflective label, possibly comprising infrared light, such as produced by Electronic Imaging Materials, Inc., that is printed in a format of a two-dimensional barcode, such as a QR code. FIG. 2 illustrates an exemplary QR code 104 on a label 102. Two-dimensional barcodes are more suitable for use than one-dimensional barcodes as a two-dimensional barcode is capable of carrying significantly more information than one-dimensional barcodes. Notably, there is significant software infrastructure, i.e., applications, which have been created for reading two-dimensional barcodes at various orientations. Additionally, the use of QR two-dimensional barcodes is free of any license restrictions in the United States.

Printing of the retroreflective label may be done locally, e.g., by workers at the factory by using the Electronic Imaging Materials, Inc. retroreflective label stock, a suitable printer, a computer to format the information to be stored on the printed label, and a software program to perform the printing, such as the BarTender software supplied by Seagull Scientific.

The label is read proximately or remotely by illuminating it with a light source that may comprise infrared light. The illumination is appropriately coordinated with a solid-state camera suitably proximate to the light source so that it receives illumination provided by the retroreflection.

Figure 3:
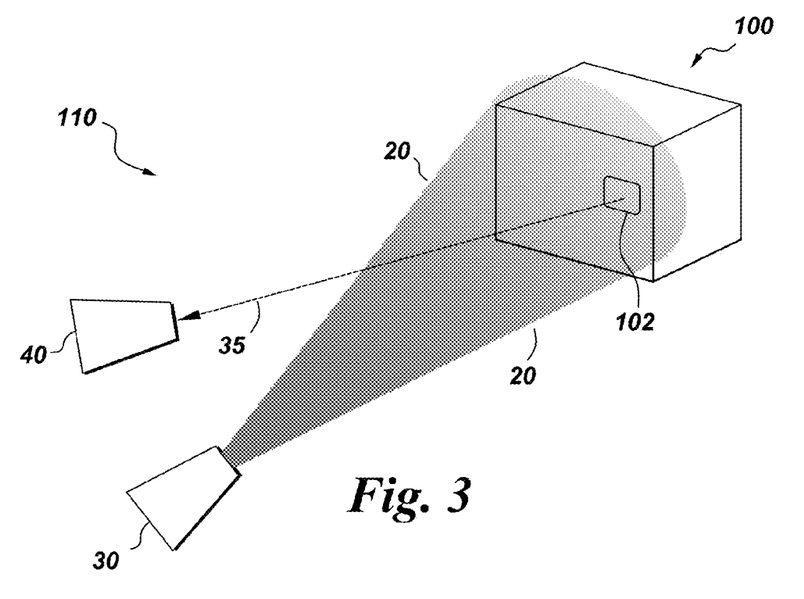
FIG. 3 is a schematic diagram of a portion of a system receiving retro reflected light according to embodiments of the present invention.

FIG. 3 illustrates a system 110 further comprising a camera 40 receiving the retroreflected infrared light 35 from the illuminated label 102. The camera 40 is optionally fitted with a filter for filtering out wavelengths of light that will be out of band with illuminating light. The camera 40 may also be fitted with optics that is appropriate for forming a process-capable image for the distance between camera 40 and object 100. The data received by the camera 40 is decoded and passed into the logistical tracking data network (not shown).

Figure 4:
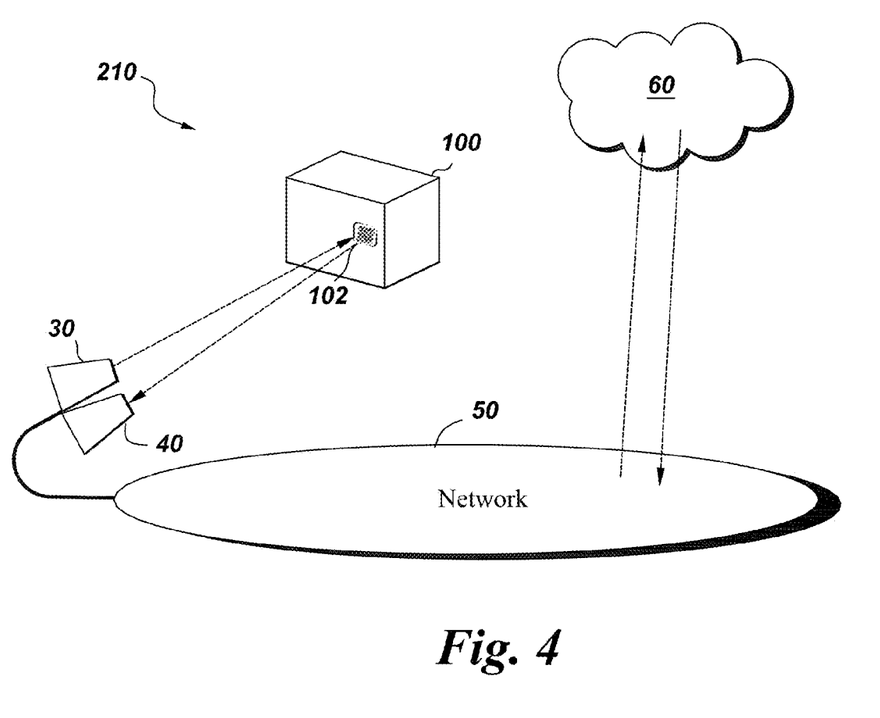
FIG. 4 is a schematic diagram of a portion of a system connected to a factory communications network and an external cloud memory according to embodiments of the present invention.

As illustrated in FIG. 4, a system 210 may further comprise a factory communications network 50 links the optical cameras 40 at the factory or warehouse. A light source 30 that may comprise infrared light illuminates the label 102 which is affixed to the object 100. A QR code reading device, or camera, 40 receives the retroreflected light from the illuminated label 102 object 100 and decodes the information carried by the QR code in the label 102. This information may be stored locally or externally in a cloud memory facility 60 in communication with the communications network 50.

Figure 5:
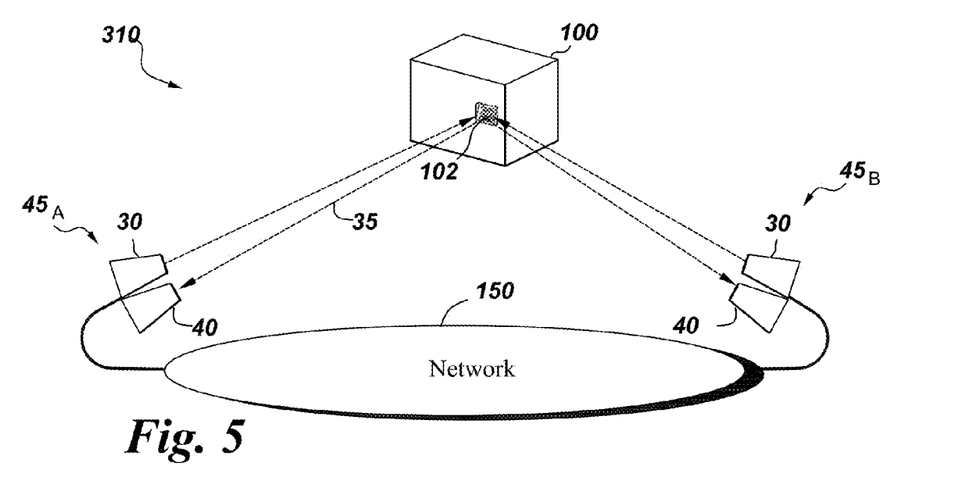
FIG. 5 is a schematic diagram of a portion of a system connected to a factory for object location according to embodiments of the present invention.

QR codes printed on retroreflective labels may be read by a plurality of cameras spatially distributed in the factory or warehouse. FIG. 5 illustrates an embodiment comprising a system 310 wherein two pairs 45 each of a light source 30 that may comprise infrared light and proximate camera 40, specifically a first pair $45_A$ light source 30 and camera 40, and a second pair $45_B$ light source 30 and camera 40, both view and interrogate the retroreflective label 102 on the object 100. The object 100 may be located by the plurality of light sources 30 and proximate camera pairs 40 by using vision-based triangulation. The light source and proximate camera pairs $45_A$, $45_B$ are connected to the factory communications network 150. Additionally, light source and proximate camera pairs $45_A$, $45_B$ may incorporate a mode allowing time of flight measurements of an outgoing and retroreflected light pulse, or very temporally short light emission, to help perform in locating the object 100 in the factory or warehouse.

Figure 6:
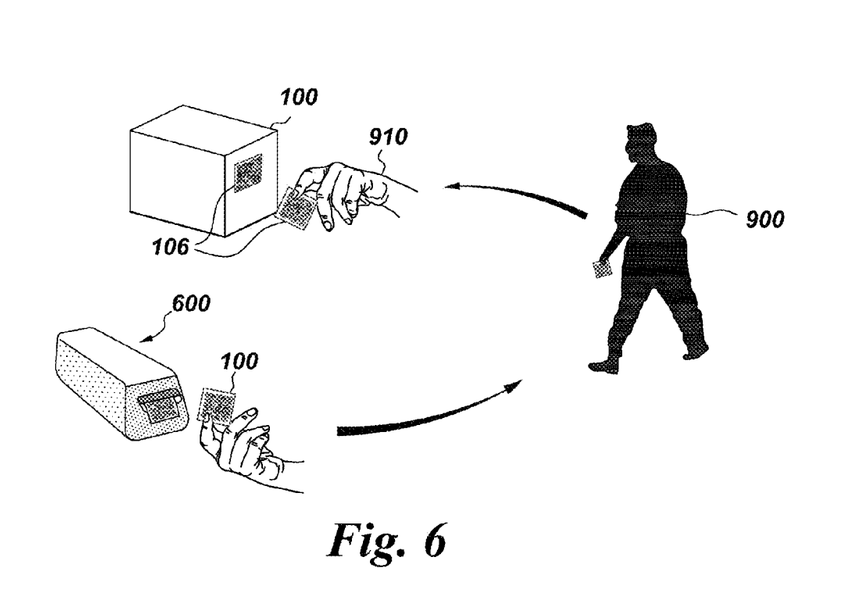
FIG. 6 is a schematic diagram of a new QR label incorporating updated information affixed to an object by a factor worker according to embodiments of the present invention.

The state of an object may be periodically or aperiodically updated or can be triggered by an update event such as when a manufacturing machine reports that the status of the tracked object has changed as due, perhaps, to a machining step being completed or the need to redo a machining step. FIG. 6 illustrates the printing of update information on a new QR label 106 produced by the local QR printer 600. The new label 106 is carried by a factory worker 900 and affixed 910 to the object 130.

Figure 7:
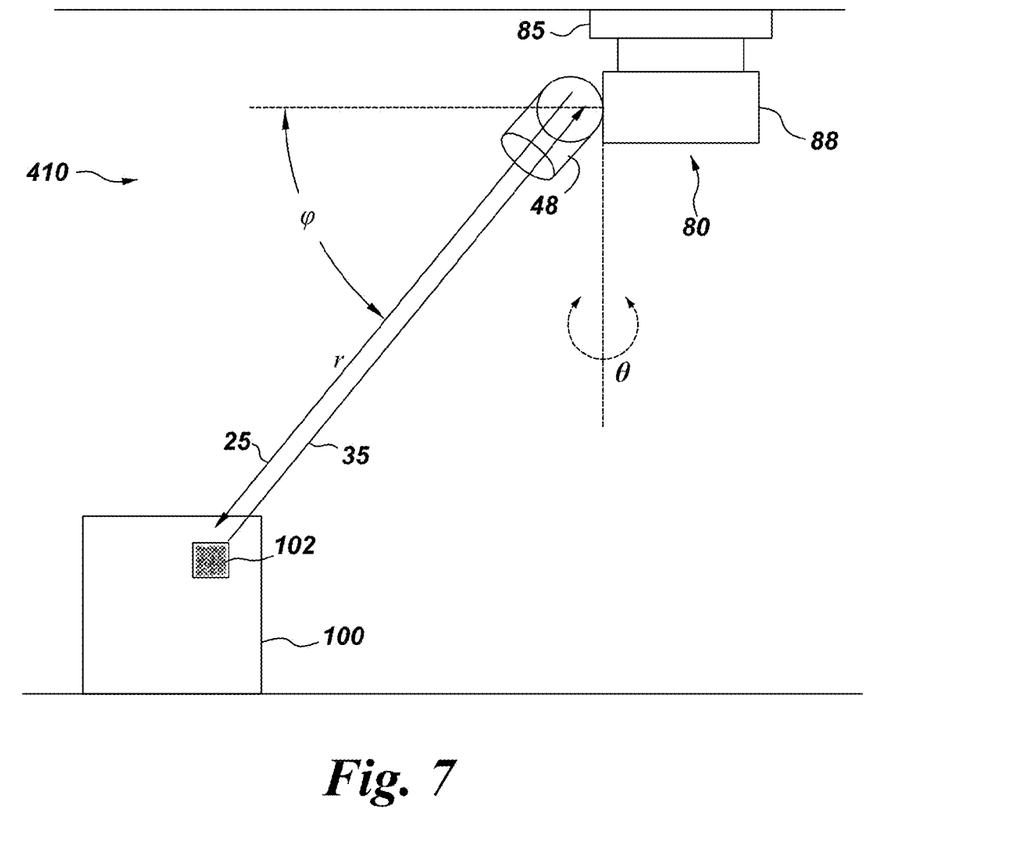
FIG. 7 is a side elevation view of a retroreflective optical label reader and associated items portion of a system according to embodiments of the present invention.

As illustrated in FIG. 7, an optics module 410 comprises a light source that may comprise infrared light and a solid-state camera suitably proximate to a light source may also comprise equipment and a mode for distance estimation, such as that described in the Texas Instruments technical white paper "Time-of-Flight Camera—An Introduction," that provides time of flight measurements of outgoing and retroreflected light to estimate the distance from the light source to the retroreflecting label 102 attached to an object 100. It is by the combination of the features of distance estimation and image processing, by and in this mode, that optics module 410 is termed a lidar label reader. The term "lidar" herein means the common meaning of "a remote sensing technology that measures distance by illuminating a target with a laser and analyzing the reflected light" as defined in Wikipedia https://en.wikipedia.org/wiki/Lidar. The acquired distance estimation data is passed into a logistical tracking data network.

Another mode for distance estimation estimates time of flight but does not use a laser, but rather an incoherent illumination source that may be optically modulated in a way well known in the art so as to allow signal processing that accurately estimates the round-trip time delay of outgoing emission to reception of the retroreflection of the outgoing emission.

The optics module 410 may be oriented about one or more rotational and/or translational degrees of freedom. Any number of angular degrees of freedom are contemplated herein. The optics module 410 may be adjustable to control characteristics of the emitted interrogator beam 25, including but not limited to adjustment of the focal length and power. The adjustments may be performed electromechanically or electro-optically under the control of the optics module controller 80. The optics module controller 80 controls the beam pointing direction of the optics module 410 and other adjustments to the optics module 410 such as the focal length of the emitted interrogator beam 25. The optics module controller 80 provides physical support to the optics module 410 and the optics module controller 80 is, in turn, attached to a support member 85.

In one embodiment, the infrared emitting aperture of the optics module 410 is defined as the origin of a spherical coordinate system $(r,\theta,\phi)$ where r is the distance from the aperture of optics module 48 to the retroreflecting label 140, $\theta$ is the rotation of the optics module 410 about the vertical from a fixed point, and $\phi$ is the tilt depression angle of the optics module 410 from horizontal.

A data network 50 (FIG. 4) may be connected to data line 428 to transport the data produced by the optics module 410, said data comprising the information recovered from the processing of the retroreflected light 35 by the solid-state camera suitably proximate to the light source, the estimate of the distance from the aperture of the optics module 410 to the retroreflecting label 102, and the angular rotation and tilt depression angle of the optics module 410, to a database for cataloguing the data produced by both the at least one optically retroreflective label reader and a scene recording camera (not illustrated). The data network 50 may also provide a gateway for cloud storage 60 of the database data.

Figure 8A:
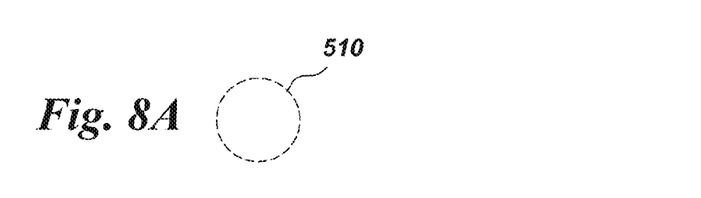
FIGS. 8A-8C are top schematic views illustrating a temporal progression of scanning of the interrogator beam of the optically retroreflective label reader according to embodiments of the present invention.
Figure 8B:
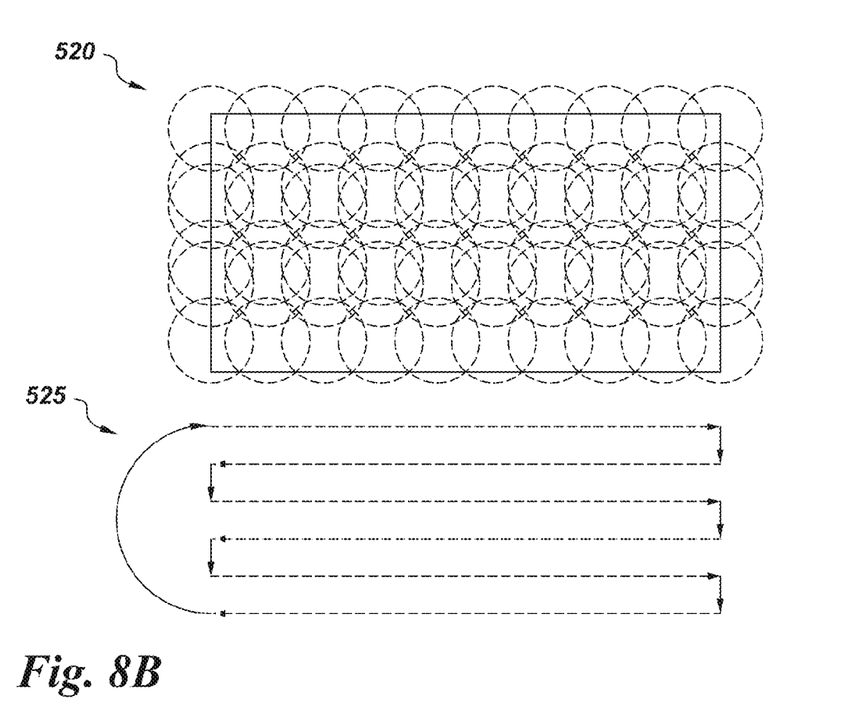

The optics module controller 80 controls the scanning of the interrogator beam 25 wherein a scan is defined as a periodic passing of the interrogator beam 25 over the area in which there may be retroreflective labels. The beam width of the interrogator beam 510 when passing over the area in which there may be retroreflective labels is an approximate circle as illustrated in FIG. 8A. In one embodiment the scanning proceeds as a stepping of interrogator beam 425 across the area in which there may be retroreflective labels as shown by 520 in FIG. 8B. The scan is side-to-side and top-to-bottom as indicated by 525. In another embodiment, even numbered scans proceed with linearly polarized light and odd numbered scans proceed with linearly polarized light at a polarization of 90° to the polarization in even numbered scans.

Figure 8C:
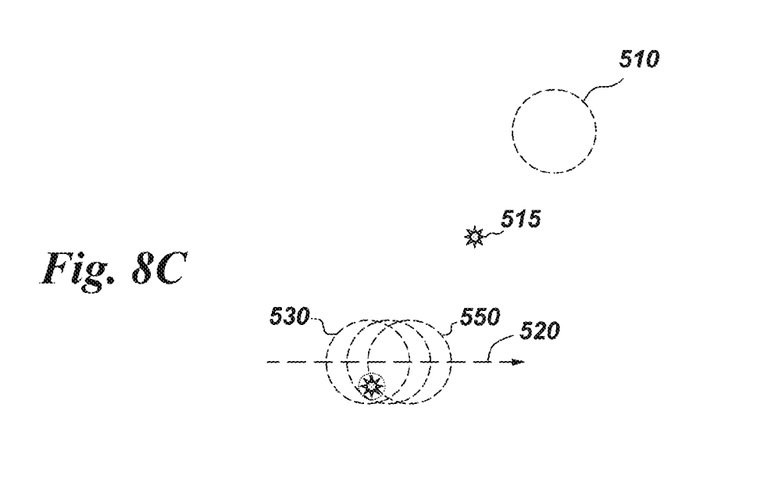

The interrogator beam's beam width 510 encompasses a retroreflective label 515 as illustrated in FIG. 8C, the scan is halted and the optics module controller 420 proceeds to adjust the beam width of the interrogator beam 425 so that the retroreflective label is approximately centered in the beam width 510 of the interrogator beam 425 and the optics module controller 420 also constricts the beam width of the interrogator beam 425 so that the retroreflective label's information can be reliably read by the solid-state camera suitably proximate to the light source. This is illustrated in FIG. 8C. Progressive stepping of the interrogator beam 425 results in its beam width being at 530 and encompassing a retroreflective label 515. The scan is halted and the interrogator beam is moved to center on the retroreflective label 515 and the interrogator beam width is constricted to a smaller size 535. After the retroreflective label's information is read and the data entered into the database, the interrogator beam width can be reset to its value 510 at the time the scan was halted and the interrogator beam is returned to pointing according to the angular rotation and tilt depression angle of the optics module controller 420 at the time the scan was halted. Scanning may then be resumed.

A database is provided to efficiently allow discovery of the status of objects that are brought into the facility, stored in the facility, and moved out of the facility. The database receives and catalogs data from the optically retroreflective label reader and its optics module controller as well as a scene recording camera that provides a digital image of the area in which there may be retroreflective labels every time there is a change in the set of retroreflective labels observed in a scan. The database is coupled to an analyst workstation from which the database will accept manually entered instructions and information from the analyst workstation and update its catalog of tracked objects. This feature is expected to be of special use for those occasions when the automated tracking associate malfunctions or when a tracked object is added to or removed from the inventory when the automated tracking associate's view of the operations is blocked.

Another function of the database is to facilitate some tracking of stages of the manufacturing process. In an embodiment of one such tracking process, the retroreflective label attached to an object may be periodically, or aperiodically, changed or updated due to an update event such as might occur when a manufacturing machine reports that the status of the tracked object has changed as due, perhaps, to a machining step being completed or the need to redo a machining step. FIG. 6 illustrates the printing of update information on a new QR label 620 produced by the local QR printer 610. The new label is carried by a factory worker 630 and affixed 640 to the object 130.

Figure 9A:
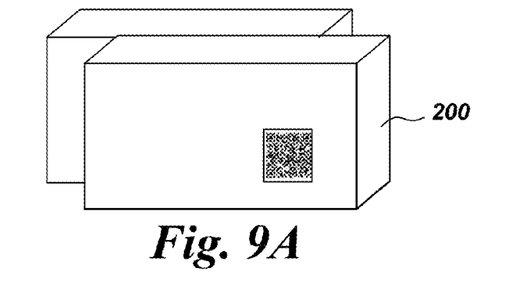
FIGS. 9A-9F are top schematic views illustrating a temporal progression of locating of a stored item according to embodiments of the present invention.
Figure 9B:
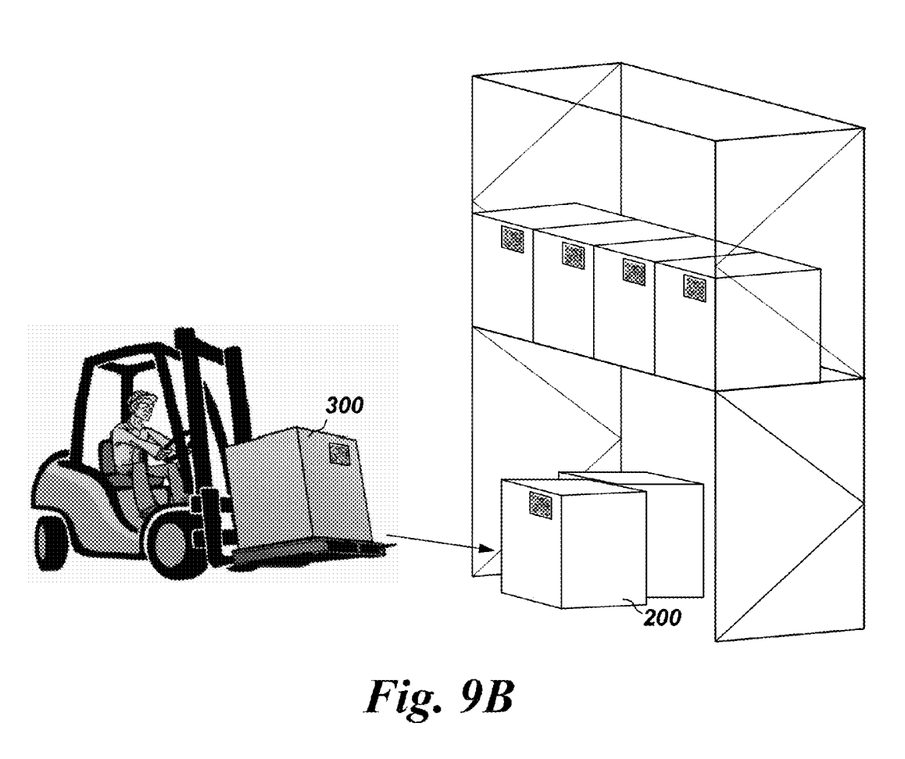
Figure 9C:
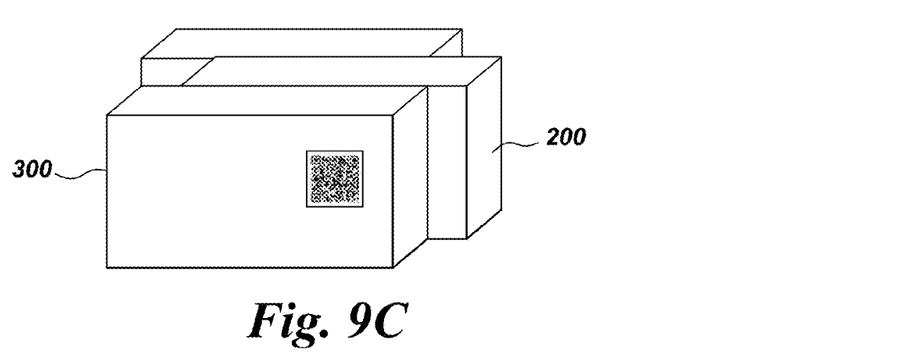
Figure 9D:
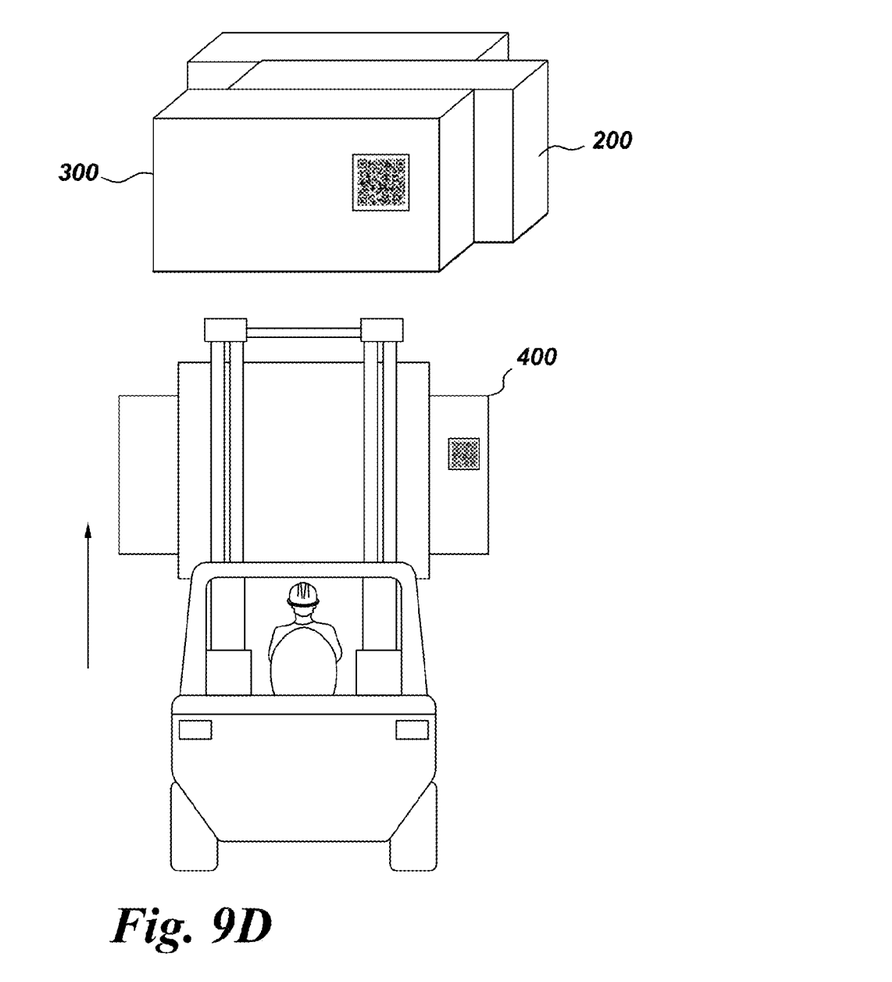
Figure 9E:
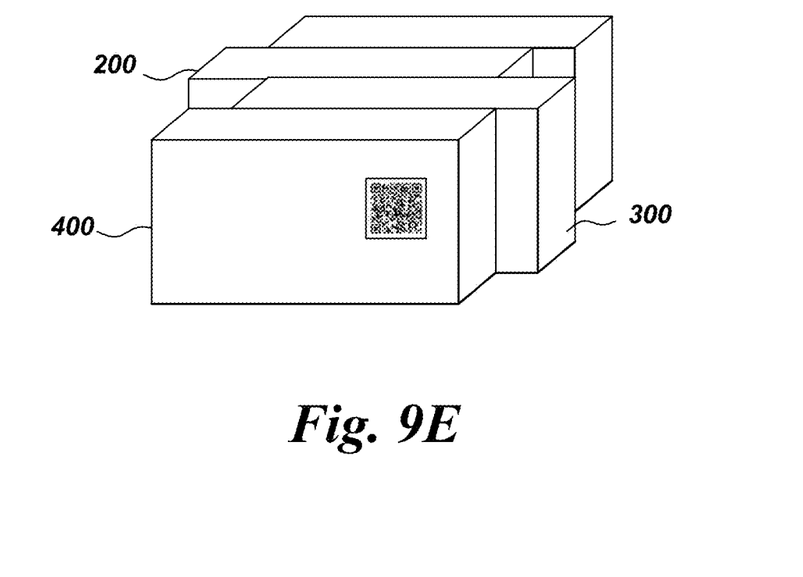
Figure 9F:
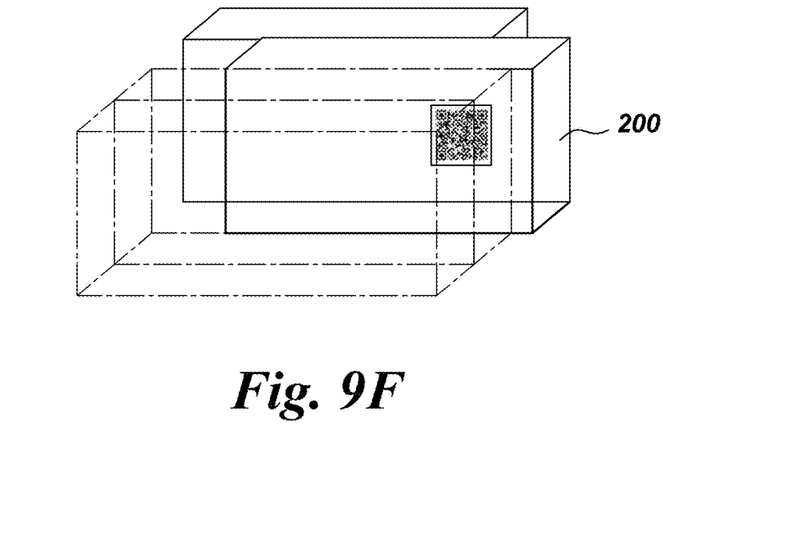

Another function of the database allows and analyst using the analyst workstation to locate a stored object whose retroreflective tag is obscured by objects placed between its retroreflective tag and an optically retroreflective label reader. FIGS. 9A-9F illustrate an exemplary process. FIG. 9A illustrates two objects. One object 200 has a retroreflective tag that is visible to an optically retroreflective label reader. FIGS. 9B-9E illustrate the deposition of two objects 300 and 400 both placed so as to obscure object 200's retroreflective tag. The analyst may query the database and determine that object 200 is somewhere in the direction in which there may be retroreflective labels although 200's retroreflective tag is not visible to an optically retroreflective label reader. The analyst, or the analyst's use of a software program crafted to display those objects intervening between object 200's retroreflective tag and an optically retroreflective label reader, displays the location of the sought object 200 as illustrated in FIG. 9F.

Therefore, according to one embodiment of the present invention, a tracking associate system comprises: a rotatable platform; an optically retroreflective label reader attached to the rotatable platform; a control unit operatively attached to the rotatable platform; a scene recording camera; and a data network configured to process data produced by at least one of the optically retroreflective label reader and the scene recording camera.

According to another embodiment of the present invention, a tracking system comprises: at least one label tracking pair, wherein the at least one label tracking pair comprises a recording camera associated with a light source emitter; a platform configured to allow the at least one label tracking pair to track a plurality of optically retroreflective labels wherein each of the plurality of optically retroreflective labels are affixed to objects; and a data network in communication with the at least one label tracking pair, the data network configured to process data received from the at least one label tracking pair.

The present invention has been described in terms of the preferred embodiment, and it is recognized that equivalents, alternatives, and modifications, aside from those expressly stated, are possible and within the scope of the appending claims.

What is claimed is:

1. A tracking associate system comprising:
 a rotatable platform;
 an optically retroreflective label reader attached to the rotatable platform, wherein the optically retroreflective label reader comprises a lidar label reader;
 a control unit operatively attached to the rotatable platform;
 a scene recording camera; and
 a data network configured to process data produced by at least one of the optically retroreflective label reader and the scene recording camera.

2. The tracking associate system of claim 1, wherein the rotatable platform comprises a two angle rotation platform.

3. The tracking associate system of claim 1, wherein the optically retroreflective label reader further comprises an optical system configured to adjust a beam width of an interrogating light beam.

4. The tracking associate system of claim 3, wherein the interrogating light beam comprises infrared light.

5. The tracking associate system of claim 4, wherein the infrared light comprises linearly polarized infrared light.

6. The tracking associate system of claim 1, wherein the rotatable platform comprises at least one servo motor.

7. The tracking associate system of claim 1, wherein the data network further comprises a database configured to catalog the data produced.

8. The tracking associate system of claim 7, further comprising a workstation operatively attached to the database.

9. A tracking system comprising:
 at least one label tracking pair, wherein the at least one label tracking pair comprises a recording camera associated with a light source emitter;
 a platform configured to allow the at least one label tracking pair to track a plurality of optically retroreflective labels wherein each of the plurality of optically retroreflective labels are affixed to objects; and
 a data network in communication with the at least one label tracking pair, the data network configured to process data received from the at least one label tracking pair.

10. The tracking system of claim 9, wherein the light source emitter comprises an optically retro reflective label reader.

11. The tracking system of claim 9, wherein the platform comprises a two angle rotation platform and a control unit.

12. The tracking system of claim 10, wherein the optically retro reflective label reader comprises an optical system configured to adjust a beam width of an interrogating light beam.

13. The tracking system of claim 12, wherein the interrogating light beam comprises infrared light.

14. The tracking system of claim 10, wherein the optically retro reflective label reader comprises a lidar label reader.

* * * * *